United States Patent
Makineedi et al.

(10) Patent No.: US 9,921,977 B2
(45) Date of Patent: *Mar. 20, 2018

(54) PRIVILEGE BASED MEMORY PINNING MECHANISM

(71) Applicant: International Business Machines Corporation, Armonk, NY (US)

(72) Inventors: Sreenivas Makineedi, Round Rock, TX (US); Srinivasa Raghavan M. Parthasarathi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 255 days.

This patent is subject to a terminal disclaimer.

(21) Appl. No.: 14/644,432

(22) Filed: Mar. 11, 2015

(65) Prior Publication Data

US 2016/0266833 A1    Sep. 15, 2016

(51) Int. Cl.
G06F 12/00 (2006.01)
G06F 12/14 (2006.01)
G06F 3/06 (2006.01)

(52) U.S. Cl.
CPC ........ *G06F 12/1441* (2013.01); *G06F 3/0622* (2013.01); *G06F 3/0637* (2013.01); *G06F 3/0673* (2013.01)

(58) Field of Classification Search
CPC ..... G06F 3/0622; G06F 3/0673; G06F 3/0637
USPC ........................................ 711/163
See application file for complete search history.

(56) References Cited

U.S. PATENT DOCUMENTS

| | | | |
|---|---|---|---|
| 7,426,720 B1* | 9/2008 | Fresko ................ | G06F 9/44563 717/140 |
| 8,539,186 B2 | 9/2013 | Sechrest et al. | |
| 2005/0022178 A1* | 1/2005 | Ghafoor ................. | G06F 8/65 717/171 |
| 2006/0155886 A1* | 7/2006 | da Silva ................ | G06F 12/08 710/5 |
| 2009/0100213 A1* | 4/2009 | Dyke ..................... | G06F 9/544 711/100 |
| 2011/0161620 A1* | 6/2011 | Kaminski .......... | G06F 12/1009 711/207 |

(Continued)

OTHER PUBLICATIONS

Makineedi et al., "Privilege Based Memory Pinning Mechanism", U.S. Appl. No. 14/859,487, filed Sep. 21, 2015.

(Continued)

*Primary Examiner* — Prasith Thammavong
(74) *Attorney, Agent, or Firm* — Teddi E. Maranzano

(57) ABSTRACT

A method for privilege based memory pinning is provided. The method includes receiving a request to pin an amount of address space memory from a process executing on an operating system. The operating system includes a configurable mode of operation. In mandatory mode, the operating system executes the request to pin address space memory based on the role hierarchy-based privilege level of the requestor process. When the requested amount is greater than the operating system's amount of memory that can be used to pin memory, the operating system fails the request. However, when the operating can satisfy the request from processes having a lower privilege level relative to the requestor process, memory is unpinned from one or more of these processes.

10 Claims, 5 Drawing Sheets

(56) References Cited

U.S. PATENT DOCUMENTS

2013/0007406 A1* 1/2013 Sheaffer ............... G06F 12/126
 711/207
2014/0082295 A1* 3/2014 Beard ................. G06F 12/0891
 711/135

OTHER PUBLICATIONS

List of IBM Patents or Patent Applications Treated as Related, dated Sep. 18, 2015, pp. 1-2.

* cited by examiner

PRIVILEGE BASED MEMORY PINNING MECHANISM

BACKGROUND

This disclosure relates generally to computer system security, and more particularly to a privilege based memory pinning mechanism.

High performance computing (HPC) focuses on developing supercomputers, parallel processing algorithms, and related software. Some sectors, such as meteorological and geological studies or genomics research where high performance levels are desirable, may implement HPC systems. An application process that has sufficient permission to operating system resources may pin some or all of its address space memory pages to attempt to increase performance. Using pinned memory, data accesses may be significantly faster, since the pages containing the required data are already in memory and do not have to be located by the operating system's paging subsystem. Additionally, pinned memory pages are not subject to being paged out from main memory to an external storage device. While the amount of pinned memory pages may be limited on a system-wide basis to a percentage of system memory, without additional access controls application processes may pin and not release large portions of their address space pages, negatively impacting overall system performance, especially for high priority applications. Conventionally, operating systems protect computer resources such as memory segments and their associated pages through a system of permissions that control which operations, such as read or write, a process can perform on them. Role Based Access Control (RBAC) is an alternative security mechanism for controlling access to computer resources. Within an organization, roles are created for various job functions, and the permissions to perform operations are assigned to the roles. In this way, a system user is assigned a particular role, such as for example the operator role. The operator role is assigned the permission to shut down and reboot the computer system, among other permissions. Since an individual user is not assigned permissions directly, but only acquires them through a role, management of individual user permissions becomes a matter of simply assigning the user to appropriate roles. Processes may then be prioritized for access to pinning shared memory when RBAC is extended to allow a similar hierarchy based system.

SUMMARY

According to one embodiment, a method for privilege based memory pinning is provided. The method includes: receiving, by an operating system executing on a computer, a request from a requestor process executing in the operating system to pin an amount of address space memory. The operating system executes the request to pin the amount of address space memory, whereby the requestor process is privileged. The operating system rejects the request to pin the amount of address space memory, whereby the requestor process is under-privileged. The operating system updates one or more of its system tables of pinned memory in use based on executing the request.

According to another embodiment, a computer program product for privilege based memory pinning is provided. The computer program product includes a computer readable storage medium readable by a processing circuit and storing instructions for execution by the processing circuit for performing a method is provided. The method includes: receiving, by an operating system executing on a computer, a request from a requestor process executing in the operating system to pin an amount of address space memory. The operating system executes the request to pin the amount of address space memory, whereby the requestor process is privileged. The operating system rejects the request to pin the amount of address space memory, whereby the requestor process is under-privileged. The operating system updates one or more of its system tables of pinned memory in use based on executing the request.

According to another embodiment, a computer system for privilege based memory pinning is provided. The computer system includes a memory, a processing unit communicatively coupled to the memory, and a management module communicatively coupled to the memory and processing unit, whereby the management module is configured to perform the steps of a method is provided. The method includes: receiving, by an operating system executing on a computer, a request from a requestor process executing in the operating system to pin an amount of address space memory. The operating system executes the request to pin the amount of address space memory, whereby the requestor process is privileged. The operating system rejects the request to pin the amount of address space memory, whereby the requestor process is under-privileged. The operating system updates one or more of its system tables of pinned memory in use based on executing the request.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
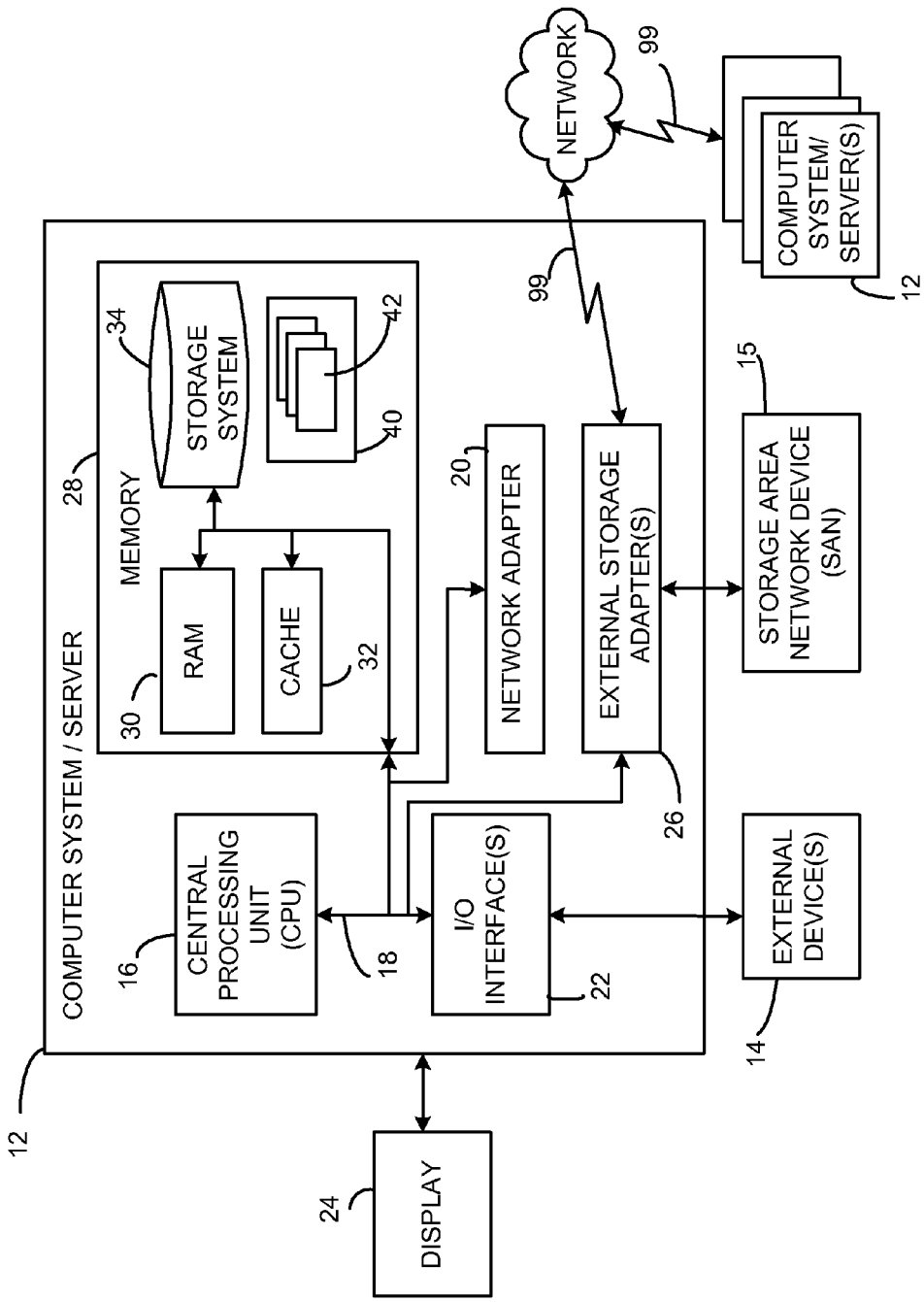
FIG. 1 illustrates an exemplary computing node operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure relates generally to the field of computer systems, and more particularly to a privilege based memory pinning mechanism. In current operation, a process that has sufficient permission may pin some or all of its address space memory pages to attempt to increase performance. Using pinned memory, data accesses may be significantly faster, since the pages containing the required data are already in memory and do not have to be located by the operating system's paging subsystem. The following described exemplary embodiments provide a system, method and program product to extend role based access control (RBAC) to include prioritized access to pinning shared memory based on a role hierarchy.

The present disclosure improves the functioning of the computer by increasing the efficiency of memory utilization through improved priority access to pinned memory. A process that has sufficient system permission may pin some or all of its address space memory pages to attempt to increase performance. In current operation, a process having a lower priority may keep its memory pinned for the duration of the operation, since the ability to pin memory pages is not governed by priority. When a sufficient number of such low priority processes pin memory, a higher priority process may be unable to have its request satisfied, since the maximum amount of system memory available for pinning has already been reached. A mechanism to pre-empt lower priority processes, through an extended RBAC implementation, ensures higher priority processes may pin memory when needed. As an additional benefit, a process may be billed for the amount of memory it pins, for example in gigabytes or pages, as well as for the duration of time the memory is pinned. In this manner, in a shared cloud computing environment programmers may be encouraged to increase the efficiency of their applications. Further, with the pinned memory algorithm, an enterprise may accurately measure and predict pinned memory usage. In a shared infrastructure or high performance cluster environment, such as cloud, granular metering may be desired to accurately predict resource usage. Using an RBAC with a privileged pinning algorithm implementation, memory usage may be accurately measured and reported, and resource costs may be appropriately apportioned among the resource's consumers.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Turning now to FIG. 1, a block diagram of an exemplary computer system (i.e., server) 12 operable for various embodiments of the disclosure is presented. As shown, the server 12 is only one example of a suitable computer for implementing a privileged based memory pinning mechanism, and is not intended to suggest any limitation as to the scope of use or functionality of embodiments of the disclosure described herein.

The server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 12 that are linked together and communicate through a communications network, such as the network 99.

The server 12 may be described in the context of executable instructions, such as a program, or more specifically, an operating system (OS) 40 that is an aggregate of program modules 42 being executed by the processing unit 16 to control the operation of the server 12. Program modules 42 perform particular tasks of the OS 40, such as process management; memory management; and device management. The program modules 42 may be implemented as routines, programs, objects, components, logic, or data structures, for example. The program modules 42 performing the particular tasks may be grouped by function, according to the server 12 component that the program modules 42 control. At least a portion of the program modules 42 may be specialized to execute the algorithm of FIGS. 3 and 4.

In a distributed computing environment, such as a cloud computing environment, each participating server 12 may be under the control of an OS 40 residing on each local and remote server 12, respectively. In a virtual machine, also referred to as a virtual server, each instance of the virtual machine is an emulation of a physical computer. A physical computer may host multiple virtual machine instances, each sharing the hardware resources of the physical computer, and each emulating a physical computer. Each of the virtual machine instances is under the control of an OS 40.

As shown in FIG. 1, the components of the server 12 may include, but are not limited to, one or more processors or processing units 16, a system memory 28, and a bus 18 that couples various system components, such as the system memory 28, to processor 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The program modules 42, the OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22. Still, the server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18. External storage adapter 26 connects the server 12 with external storage subsystems, such as a storage area network (SAN) 15 or RAID array. Exemplary external storage adapters 26 include, but are not limited to, a host bus adapter (HBA), host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

Figure 2:
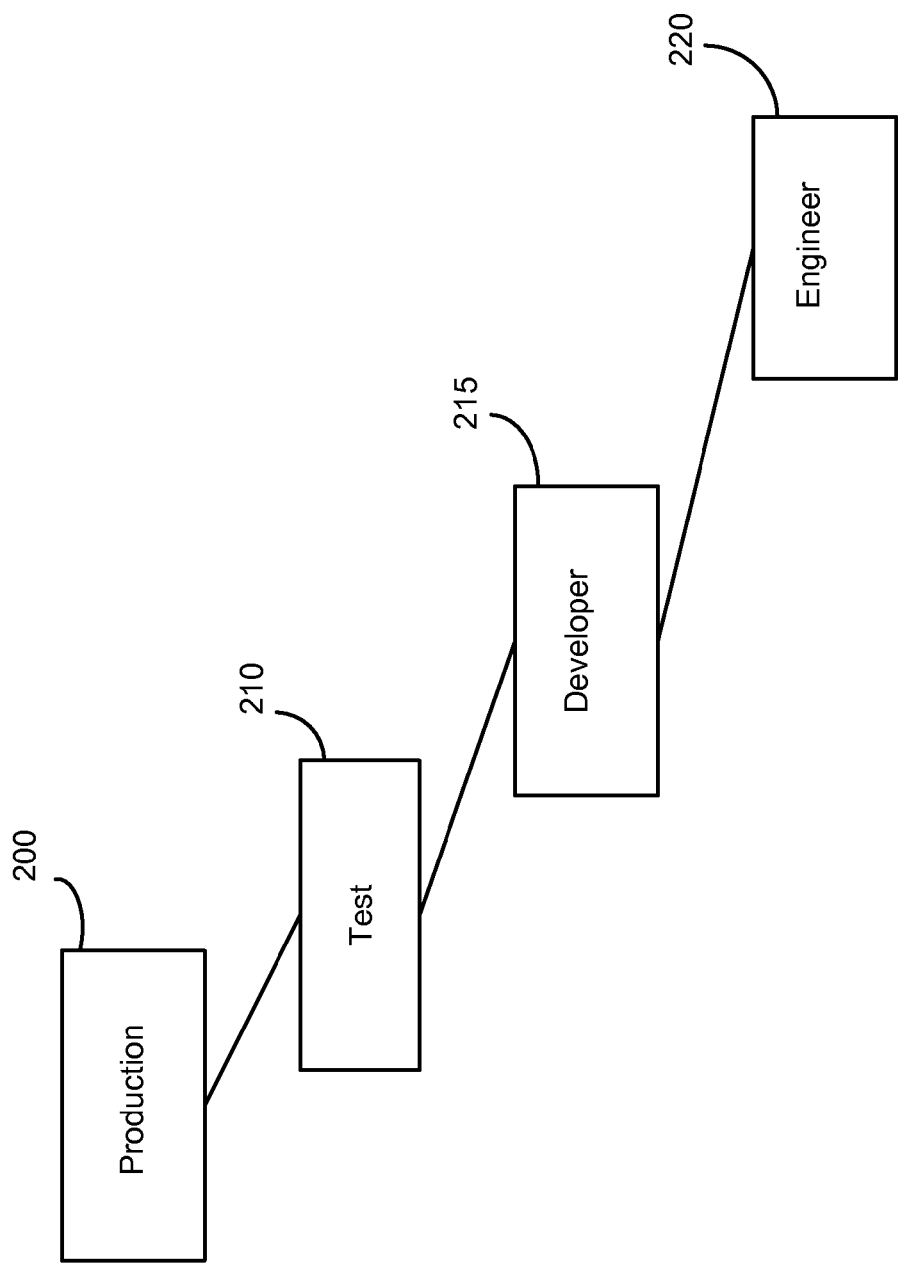
FIG. 2 illustrates an exemplary role hierarchy, according to various embodiments of the disclosure.

Referring now to FIG. 2, an exemplary role based hierarchy with several roles is illustrated. In general, traditional privilege administration in an OS 40 (FIG. 1) is delivered through a super user account, referred to as the root user, which has the authority to perform all aspects of system administration on the server 12 (FIG. 1). The root user may create additional users, and each user may have a subset of root's authority. The OS 40 (FIG. 1) identifies a user by a unique userid (UID) number. The root user may also create one or more groups, identified by a group id (GID). Users are assigned to a group based on having similar access requirements for an object. Privileges may also be administered using discretionary access control (DAC). In DAC a user who creates an object, such as a file or an executable program, defines a series of object permission bits that determine whether another user or group may access the object, and what types of operations may be performed. The object permission bits describe access, i.e., read, write, execute, for the owner, group, and others, and are based on the UID and GID to which a user belongs. The owner, group, and others object permission bits are conventionally referred to as rwxrwxrwx. For example, if the object is an executable program, using UID/GID access controls only those users with the appropriate UID, or with membership in the appropriate group may execute the program. A general user may execute a privileged operation, such as pinning memory, by temporarily assuming the root user's identity in a practice referred to as setuid. However, a user executing a setuid program also temporarily inherits all of the root user's authority, thereby presenting a security exposure. Further, both the DAC and setuid models lack a mechanism to pre-empt lower priority processes from consuming a disproportionate amount of the available pinned memory resource.

The least privileged principle, as described in the RBAC standard, is another approach to security that grants a program process only the authority required to perform a specific task. By implementing a role hierarchy, the present disclosure additionally provides for pre-empting lower priority processes. In core RBAC, users are assigned to roles, permissions are assigned to the roles, and the users acquire permissions by being members of the roles. In a many-to-many relationship, the same user may be assigned to many roles and a single role may have many users. Similarly, a single permission may be assigned to many roles and a single role may be assigned to many permissions. Therefore, RBAC provides a mechanism through which activities that are typically reserved for a root user can be assigned to non-root general system users when the users are assigned to appropriate roles. An activity may include certain privileged administrator commands, such as reboot and shutdown. Privileged system calls, such as mlock( ) which is used to pin memory, may also be assigned to roles. When the roles are structured in a hierarchy, a relationship may be established among the processes such that processes having a lower priority, also referred to a junior roles, may be pre-empted by higher priority processes, i.e., senior roles. The RBAC standard is both well-known in the art and implementation dependent. Therefore, defining and activating roles, as such, will not be discussed with reference to the present disclosure, since any available implementation may be used.

As shown in FIG. 2 the production 200 role is the senior-most role. In this example, the production 200 role is allowed to execute system calls to pin and manipulate shared memory, among other functions. A production user, identified by userid, may be assigned to the production 200 role. A test user may be assigned to the test role 210, which is junior to the production 200 role. A tester, when performing the tasks of the test 210 role may also be allowed to execute system calls to pin and manipulate shared memory. However, according to the RBAC implementation of this disclosure, as the junior role in the hierarchy, the tester's requests may be satisfied subject to the higher priority requests from a production user. Similarly, the developer 215 role is junior to both the production 200 role and the test 210 role. Therefore, a user assigned the developer 215 role may be subject to prior pin requests from both the production 200 role and the test 210 role. The engineer 220, being the most junior in the hierarchy, may have only a small subset of the functions assigned in comparison to the more senior roles. For example a user assigned to the engineer 220 role may not be allowed to execute system calls to pin and manipulate shared memory.

Figure 3:
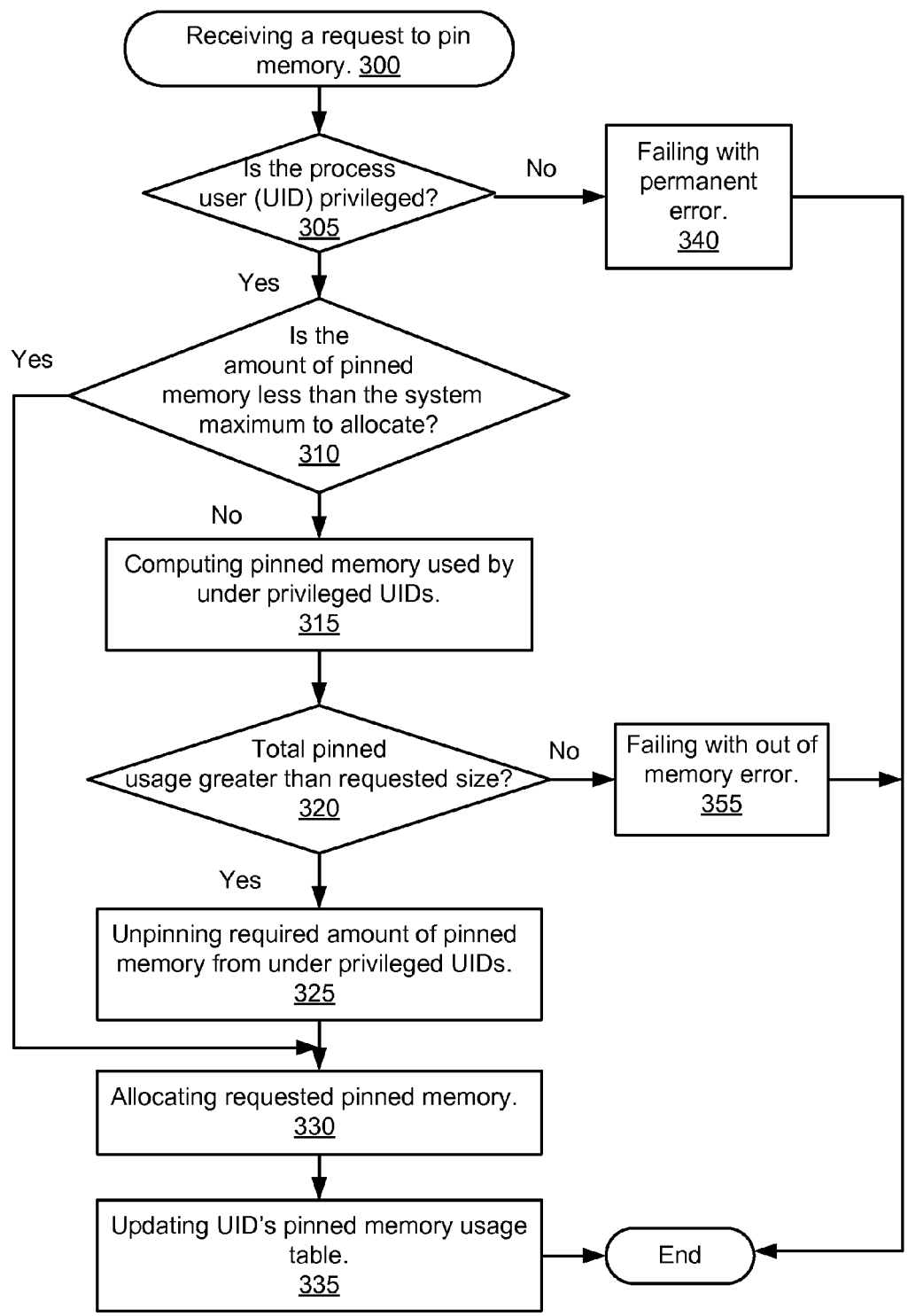
FIG. 3 is an operational flowchart illustrating an algorithm for privilege based memory pinning, according to various embodiments of the disclosure.

Referring now to FIG. 3, an algorithm for privilege based memory pinning, according to various embodiments of the disclosure, is illustrated. FIG. 3 illustrates a system with an active RBAC implementation. RBAC, where users acquire permissions based on their assigned roles, is one of several available security options. Without an active RBAC implementation, pinned memory requests may be processed according to the operating system's native algorithm. At 300 the OS 40 (FIG. 1) receives a request from a process (i.e., the requestor process) to pin a portion of its address space memory pages.

At 305 the RBAC role of the process is evaluated. If at 305 the process is associated with an under-privileged user, at 340 the OS 40 (FIG. 1) fails the request with a permanent error, such as EPERM. An under-privileged user is one that is assigned to a role that is lower in the RBAC hierarchy compared to another role. For this example, an under-privileged user is one that is assigned to a lower role in the RBAC hierarchy relative to the role of the user that is the parent of the requestor process user (i.e., the privileged user).

If at 305 the process is associated with a privileged user, as identified by UID, at 310 the OS 40 (FIG. 1) determines whether any pinned memory is available for allocation. In practice, an operating system sets a configurable maximum percentage, such as 80 percent, of its memory that may be used to satisfy requests to pin memory. By setting a limit, the OS 40 (FIG. 1) ensures memory is available for other tasks, such as creating and dispatching processes. Additionally, insufficient available memory contributes to poor performance, since in a low memory environment a process's requests for memory pages may only be satisfied by evicting from memory another process's pages. Therefore, if at 310 the privileged process's pinned memory request can be satisfied from the amount of memory available for such requests, at 330, the requested pinned memory amount is allocated to the privileged process. Finally, at 335 the OS 40 (FIG. 1) may update its various tables and structures that track process memory usage by decrementing those processes from whom memory may have been unpinned and incremented the pinned memory usage of the successful requestor process. The OS 40 (FIG. 1) may also update any segment and/or page ownership modifications that may result from satisfying the pinned memory request.

However, at 310 there may not be a sufficient amount of available memory on the system to satisfy the request for pinned memory. Therefore at 315 the OS 40 (FIG. 1) computes how much pinned memory is currently in use by processes executing by under-privileged users. In practice, an OS 40 (FIG. 1) may enforce a configurable per-user or per-process limit to the pinned memory system resource, and track the actual amount in-use. Thus, by aggregating the amount of pinned memory for each user and/or process, and adding any amount in use by the kernel, a total amount of in-use pinned memory is determined.

At 320, if the in-use amount of pinned memory is greater than or equal to the requested pinned memory amount, at 325 the OS 40 (FIG. 1) unpins an amount of pinned memory from at least one under-privileged process to satisfy the request. In one embodiment, the OS 40 (FIG. 1) may search its internal process control tables, lists, or other similar structures that track state information, for an under-privileged process having pinned memory in an amount approximately equal to the requested amount. In another embodiment, the OS 40 (FIG. 1) may unpin memory from one or more under-privileged processes to satisfy the requested amount to pin. In still another embodiment, the OS 40 (FIG. 1) may unpin memory from one or more under-privileged processes having memory pinned for the longest duration of time. In yet another embodiment, the OS 40 (FIG. 1) may unpin a statistical amount, such as a percentage, from one or more under-privileged processes.

At 330, having unpinned enough memory from at least one under-privileged process, the OS 40 (FIG. 1) allocates the requested pinned memory amount to the requesting privileged requestor process. Finally, at 335 the OS 40 (FIG. 1) may update its various tables and structures that track process memory usage by decrementing those users from whom memory was unpinned and incrementing the pinned memory usage of the successful requestor.

However, if at 320 the total pinned memory usage is not greater than the requested amount, at 355 the request fails with an out of memory error such as ENOMEM. In this case, the request is failed because the amount of memory available to satisfy such a request is exhausted, and even if the pinned memory held by under-privileged processes is released, there still is not enough memory available to satisfy the request.

Figure 4:
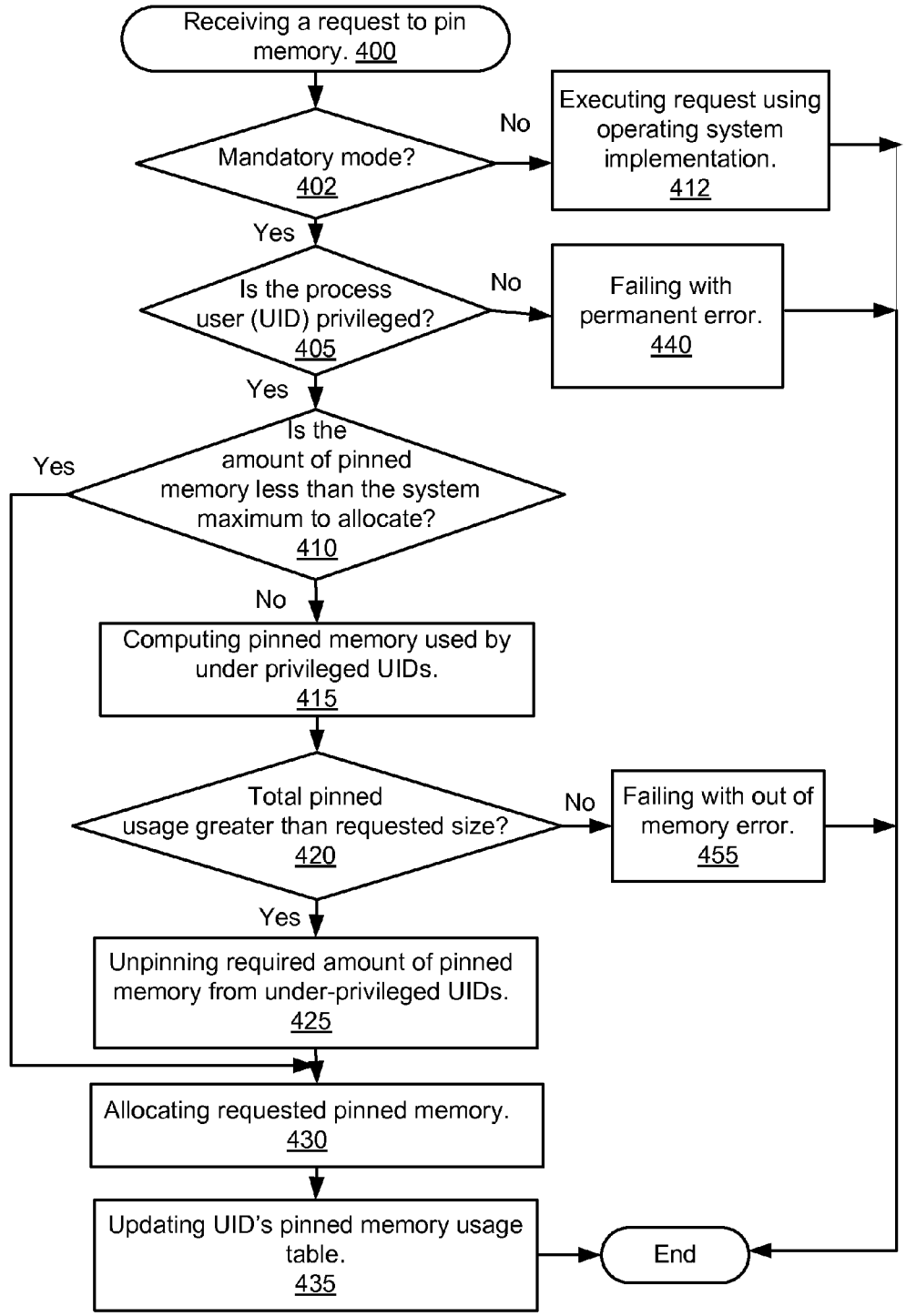
FIG. 4 is an operational flowchart illustrating an alternate algorithm for privilege based memory pinning, according to various embodiments of the disclosure.

Referring now to FIG. 4, an alternate algorithm for privileged based memory pinning is illustrated. At 400 the OS 40 (FIG. 1) receives a request from a process to pin a portion of its address space memory pages. As in the embodiment of FIG. 3, this embodiment includes an active RBAC implementation. This embodiment includes a configurable mode of operation that allows the OS 40 (FIG. 1) to optionally bypass the algorithm described previously with reference to FIG. 3. In discretionary mode, the OS 40 (FIG. 1) may execute pinned memory requests using the operating system's native algorithm, such as on a first-come-first-served basis, even though RBAC is implemented. However, in mandatory mode, the OS 40 (FIG. 1) may execute the algorithm of FIG. 4. The mode of operation may be configured prior to system activation. Alternatively, the mode of operation may also be dynamically changed, for example by a systems administrator, during system operation.

At 402, the OS 40 (FIG. 1) queries the configurable mode of operation system parameter to determine how to execute requests for pinned memory. In discretionary mode, the OS 40 (FIG. 1) may execute pinned memory requests using the operating system's native algorithm, even though RBAC is implemented. In mandatory mode, the OS 40 (FIG. 1) may use the algorithm of FIG. 4. If at 402 discretionary mode is configured, at 412 pinned memory requests may be processed according to the operating system's native algorithm.

However if at 402 mandatory mode is configured, at 405 the RBAC role of the user that is the parent of the requestor process is evaluated. An under-privileged user is one that is assigned to a role that is lower in the RBAC hierarchy compared to another role. For this example, an under-privileged user is one that is assigned to a lower role in the RBAC hierarchy relative to the role of the user that is the parent of the requestor process user (i.e., the privileged user). If the process is under-privileged, at 440 the OS 40 (FIG. 1) fails the request with a permanent error, such as EPERM.

If at 405 the process is associated with a privileged user, as identified by UID, at 410 the OS 40 (FIG. 1) determines whether any pinned memory is available for allocation. In practice, an operating system sets a configurable maximum percentage, such as 80 percent, of its memory that may be used to satisfy requests to pin memory. By setting a limit, the OS 40 (FIG. 1) ensures memory is available for other tasks, such as creating and dispatching processes. Additionally, insufficient available memory contributes to poor performance, since in a low memory environment a process's requests for memory pages may only be satisfied by evicting from memory pages from another process. Therefore, if at 410 the privileged process's pinned memory request can be satisfied from the amount of memory available for such requests, at 430, the requested pinned memory amount is allocated to the privileged process. Finally, at 435 the OS 40 (FIG. 1) updates its various tables and structures that track process memory usage by decrementing those users from whom memory was unpinned and incremented the pinned memory usage of the requestor. The OS 40 (FIG. 1) may also update any segment and/or page ownership modifications that may result from satisfying the pinned memory request.

However, at 410 there may not be a sufficient amount of available memory on the system to satisfy the request for pinned memory. Therefore at 415 the OS 40 (FIG. 1) computes how much pinned memory is currently in use by under-privileged users. In practice, an OS 40 (FIG. 1) may enforce a configurable per-user or per-process limit to the pinned memory system resource, and track the actual amount in-use. Thus, by aggregating the amount of pinned memory for each user and/or process, and adding any amount in use by the kernel, a total amount of in-use pinned memory is determined.

At 420, if the in-use amount of pinned memory is greater than or equal to the requested pinned memory amount, at 425 the OS 40 (FIG. 1) unpins an amount of pinned memory from at least one under-privileged process to satisfy the request. In one embodiment, the OS 40 (FIG. 1) may search its internal process control tables, lists, or other similar structures that track state information, for an amount approximately equal to the requested amount. In another embodiment, the OS 40 (FIG. 1) may unpin memory from one or more least privileged processes to satisfy the requested amount to pin. In still another embodiment, the OS 40 (FIG. 1) may unpin memory from one or more under-privileged processes having memory pinned for the longest duration. In yet another embodiment, the OS 40 (FIG. 1) may unpin a statistical amount, such as a percentage, from one or more under-privileged processes.

At 430, having unpinned enough memory from at least one under-privileged process, the OS 40 (FIG. 1) allocates the requested pinned memory amount to the privileged process. Finally, at 435 the OS 40 (FIG. 1) updates its various tables and structures that track process memory usage by decrementing those processes from whom memory may have been unpinned and incrementing the pinned memory usage of the successful requestor.

However, if at 420 the total pinned memory usage is not greater than the requested amount, at 455 the request fails with an out of memory error such as ENOMEM. In this case, the request is failed because the amount of memory available to satisfy such a request is exhausted, and even if pinned memory held by under-privileged users is released, there still is not enough memory available to satisfy the request.

Figure 5:
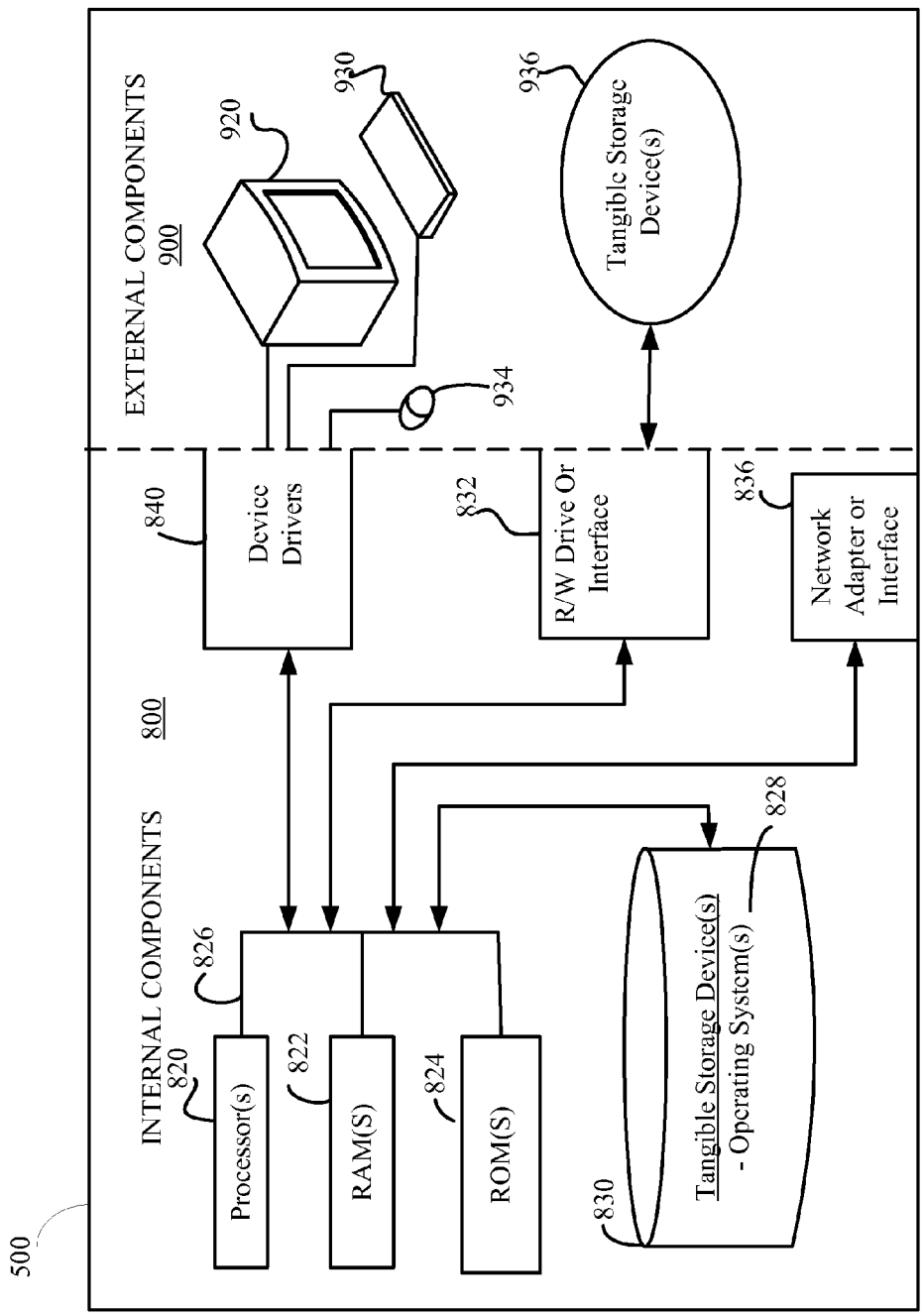
FIG. 5 is a schematic block diagram of hardware and software of the computer environment according to an embodiment of the processes of FIGS. 3 and 4.

Referring now to FIG. 5, computing device 500 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method of FIGS. 3 and 4; and one or more computer-readable tangible storage devices 830. The one or more operating systems 828 (including the additional data collection facility) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 400, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer program product for privilege based memory pinning comprising a computer readable storage medium readable by a processing circuit and storing instructions for execution by the processing circuit for performing a method comprising:
   receiving, by an operating system executing on a computer operating in a role-based access control (RBAC) mandatory mode, a request from a requestor process executing in the operating system to pin an amount of address space memory, wherein pinning memory prevents the operating system from paging out the amount of address space memory;
   determining a role to which the requestor process is assigned in the RBAC hierarchy; and
   executing the request to pin the amount of address space memory based on the requestor process being assigned to a role that is permitted to pin memory in the RBAC hierarchy, wherein executing the request further comprises:
      calculating a total amount of pinned memory in use by all under-privileged non-requestor processes, wherein an under-privileged process is a process that is assigned to a lower role in the RBAC hierarchy relative to the requestor process and a non-requestor process is a process other than the requestor process, and;
      executing the request to pin the amount of address space memory, wherein the executing further comprises: failing the request when the requested amount is greater than the calculated total amount;
      unpinning an amount of pinned memory from at least one under-privileged non-requestor process, based on the calculated total amount being greater than the requested amount; and
      pinning the unpinned amount of memory in the address space of the requestor process.

2. The computer program product of claim 1, wherein the mode of operation is dynamically configurable after the operating system activation.

3. The computer program product of claim 1, wherein the amount of pinned memory to unpin from the at least one under-privileged non-requestor process is configurable and is based on at least one of:
- unpinning a statistical amount of pinned memory from each under-privileged non-requestor process;
- a level of privilege; and
- selecting at least one under-privileged non-requestor process having pinned memory for a longest duration of time.

4. The computer program product of claim 1, wherein the mode of operation is a discretionary mode of operation, wherein the operating system executes a native memory pinning algorithm and bypasses the RBAC hierarchy implementation.

5. The computer program product of claim 1, wherein the mode of operation is a mandatory mode of operation, wherein the operating system executes the request to pin the amount of address space memory based on the RBAC role of the requestor process.

6. A computer system for privilege based memory pinning comprising one or more processors, one or more computer-readable storage devices, and a plurality of program instructions stored on at least one of the one or more storage devices for execution by at least one of the one or more processors, the plurality of program instructions comprising:
- receiving, by an operating system executing on a computer operating in a role-based access control (RBAC) mandatory mode, a request from a requestor process executing in the operating system to pin an amount of address space memory, wherein pinning memory prevents the operating system from paging out the amount of address space memory;
- determining a role to which the requestor process is assigned in the RBAC hierarchy; and
- executing the request to pin the amount of address space memory based on the requestor process being assigned to a role that is permitted to pin memory in the RBAC hierarchy, wherein executing the request further comprises:
  - calculating a total amount of pinned memory in use by all under-privileged non-requestor processes, wherein an under-privileged process is a process that is assigned to a lower role in the RBAC hierarchy relative to the requestor process and a non-requestor process is a process other than the requestor process, and;
  - executing the request to pin the amount of address space memory, wherein the executing further comprises: failing the request when the requested amount is greater than the calculated total amount;
  - unpinning an amount of pinned memory from at least one under-privileged non-requestor process, based on the calculated total amount being greater than the requested amount; and
  - pinning the unpinned amount of memory in the address space of the requestor process.

7. The computer system of claim 6, wherein the mode of operation is dynamically configurable after the operating system activation.

8. The computer system of claim 6, wherein the amount of pinned memory to unpin from the at least one under-privileged non-requestor process is configurable and is based on at least one of:
- unpinning a statistical amount of pinned memory from each under-privileged non-requestor process;
- a level of privilege; and
- selecting at least one under-privileged non-requestor process having pinned memory for a longest duration of time.

9. The computer system of claim 6, wherein the mode of operation is a discretionary mode of operation, wherein the operating system executes a native memory pinning algorithm and bypasses the RBAC hierarchy implementation.

10. The computer system of claim 6, wherein the mode of operation is a mandatory mode of operation, wherein the operating system executes the request to pin the amount of address space memory based on the RBAC role of the requestor process.

* * * * *